(12) United States Patent
Syme et al.

(10) Patent No.: US 11,949,707 B1
(45) Date of Patent: Apr. 2, 2024

(54) ISOLATING SUSPICIOUS LINKS IN EMAIL MESSAGES

(71) Applicant: CLOUDFLARE, INC., San Francisco, CA (US)

(72) Inventors: Philip Syme, Ellicott City, MD (US); Michelle Chen, New York, NY (US); Jeremy Michael Eckman, Annapolis, MD (US); Michael J. Flester, Highland, MD (US); Shalabh Mohan, Los Altos, CA (US); Timothy Obezuk, San Francisco, CA (US)

(73) Assignee: CLOUDFARE, INC., San Francisco, CA (US)

( * ) Notice: Subject to any disclaimer, the term of this patent is extended or adjusted under 35 U.S.C. 154(b) by 0 days.

(21) Appl. No.: 18/361,564

(22) Filed: Jul. 28, 2023

Related U.S. Application Data (60) Provisional application No. 63/509,260, filed on Jun. 20, 2023.

(51) Int. Cl.
  *H04L 9/40* (2022.01)
(52) U.S. Cl.
  CPC ........ *H04L 63/1441* (2013.01); *H04L 63/123* (2013.01)
(58) Field of Classification Search
  CPC .............. H04L 63/1441; H04L 63/123; H04L 63/1416; H04L 63/1425; G06F 2221/2119
  See application file for complete search history.

(56) References Cited

U.S. PATENT DOCUMENTS

| | | | | |
|---|---|---|---|---|
| 10,873,588 | B2 * | 12/2020 | Woodworth, Jr. | .... H04L 63/101 |
| 11,089,061 | B1 * | 8/2021 | Sinha | ..................... H04L 51/212 |
| 2015/0237068 | A1 * | 8/2015 | Sandke | ............... H04L 63/1425 |
| | | | | 726/23 |
| 2019/0007426 | A1 * | 1/2019 | Bergström | ............... G06F 21/53 |
| 2020/0374250 | A1 * | 11/2020 | Le Strat | ................ H04L 67/306 |
| 2020/0404000 | A1 * | 12/2020 | Hayes | ................. H04L 63/1483 |
| 2021/0126938 | A1 * | 4/2021 | Trost | ..................... G06F 21/552 |
| 2022/0050923 | A1 * | 2/2022 | Chen Kaidi | ............ G06F 21/44 |

(Continued)

OTHER PUBLICATIONS

Saurabh et al., "Masquerading Email Detection," 2022 VIII International Conference on Information Technology and Nanotechnology (ITNT) Year: 2022 | Conference Paper | Publisher: IEEE.*

(Continued)

*Primary Examiner* — Roderick Tolentino
(74) *Attorney, Agent, or Firm* — NICHOLSON DE VOS WEBSTER & ELLIOTT LLP

(57) ABSTRACT

Isolating suspicious email links is described. An email security service receives an email that includes a link that refers to an external resource. A first suspicious link determination is performed to determine whether the link is suspicious. If the link is suspicious, the link is rewritten to refer to the email security and the email is delivered to the recipient. A request from a client device is received responsive to the link being opened. A second suspicious link determination is performed to determine whether the link is suspicious. If the link is suspicious, an interstitial page is transmitted to the client device that includes an option that, when selected, causes the first link to be opened in a remote browser isolation session.

18 Claims, 7 Drawing Sheets

(56) References Cited

U.S. PATENT DOCUMENTS

2022/0368662 A1* 11/2022 Tomkow ................. H04L 67/10
2023/0224325 A1* 7/2023 Mautone ............... H04L 63/083
　　　　　　　　　　　　　　　　　　　　　　　　　　726/22

OTHER PUBLICATIONS

Rekeraho et al., "Sandbox Integrated Gateway for the Discovery of Cybersecurity Vulnerabilities," 2022 International Symposium on Electronics and Telecommunications (ISETC) Year: 2022 | Conference Paper | Publisher: IEEE.*

* cited by examiner

ISOLATING SUSPICIOUS LINKS IN EMAIL MESSAGES

CROSS-REFERENCE TO RELATED APPLICATIONS

This application claims the benefit of U.S. Provisional Application No. 63/509,260, filed Jun. 20, 2023, which is hereby incorporated by reference.

FIELD

Embodiments of the invention relate to the field of computer security; and more specifically, to the isolation of suspicious links in email messages.

BACKGROUND

Email is a common threat vector for attackers to attack users and/or networks. For example, an email attachment may contain malicious code that executes after the user opens the file. As another example, a phishing attack is a very common email attack. In a phishing attack, the attacker may try to trick the user to click a malicious link by including bait words or phrases such as well-known brand names, or by using replica pages of well-known brands. The malicious web page may impersonate a legitimate fill-in form to collect the data of the user (e.g., username/password). Other malicious pages may download malware to the machine.

Some email security systems rewrite every link in an email to be scanned by the system. Such systems may then analyze the link and, depending on policy and/or risk profile, block a malicious link or isolate a link in a remote browser using a browser mirroring isolation mechanism (e.g., Document Object Model (DOM) mirroring). Rewriting all the links in the email adds the inconvenience of forcing users to click-through an intermediary link for benign links. In addition, if the system rewriting links has a bug or is down, then all links are unavailable (even links to known business systems like corporate email or file sharing links). Also, rewriting all links causes the links to be obfuscated, which is inconvenient for benign links and can cause unnecessary concern to end users.

SUMMARY

Isolating suspicious links in email messages is described. An email is received at an email security service. The email security service inspects the email to determine whether the email includes a link that is suspicious (e.g., is a link that potentially points to a malicious web page or resource). The email security service rewrites any link that it determines is suspicious to link to the email security service and transmits the modified email to the recipient. Upon a modified link being selected (e.g., a user has opened the modified email and clicked on the modified link), the email security service inspects the resource (e.g., the web page) to determine whether the resource is suspicious (e.g., a page that is suspected to be malicious). If the email security service determines that the resource is suspicious, the email security service causes an interstitial page to be presented to the user that includes an option for the user to proceed to the suspicious link in a remote browser isolation session. If the user elects to proceed to the suspicious link, that link is opened in a remote browser isolation session.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Isolating suspicious links in email messages is described. An email is received at an email security service. The email security service inspects the email to determine whether the email includes a link that is suspicious (e.g., is a link that potentially points to a malicious web page or resource). The email security service rewrites any link that it determines is suspicious to link to the email security service and transmits the modified email to the recipient. Upon a modified link being selected (e.g., a user has opened the modified email and clicked on the modified link), the email security service inspects the resource (e.g., the web page) to determine whether the resource is suspicious (e.g., a page that is suspected to be malicious). If the email security service determines that the resource is suspicious, the email security service causes an interstitial page to be presented to the user that includes an option for the user to proceed to the suspicious link in a remote browser isolation session.

Figure 1:
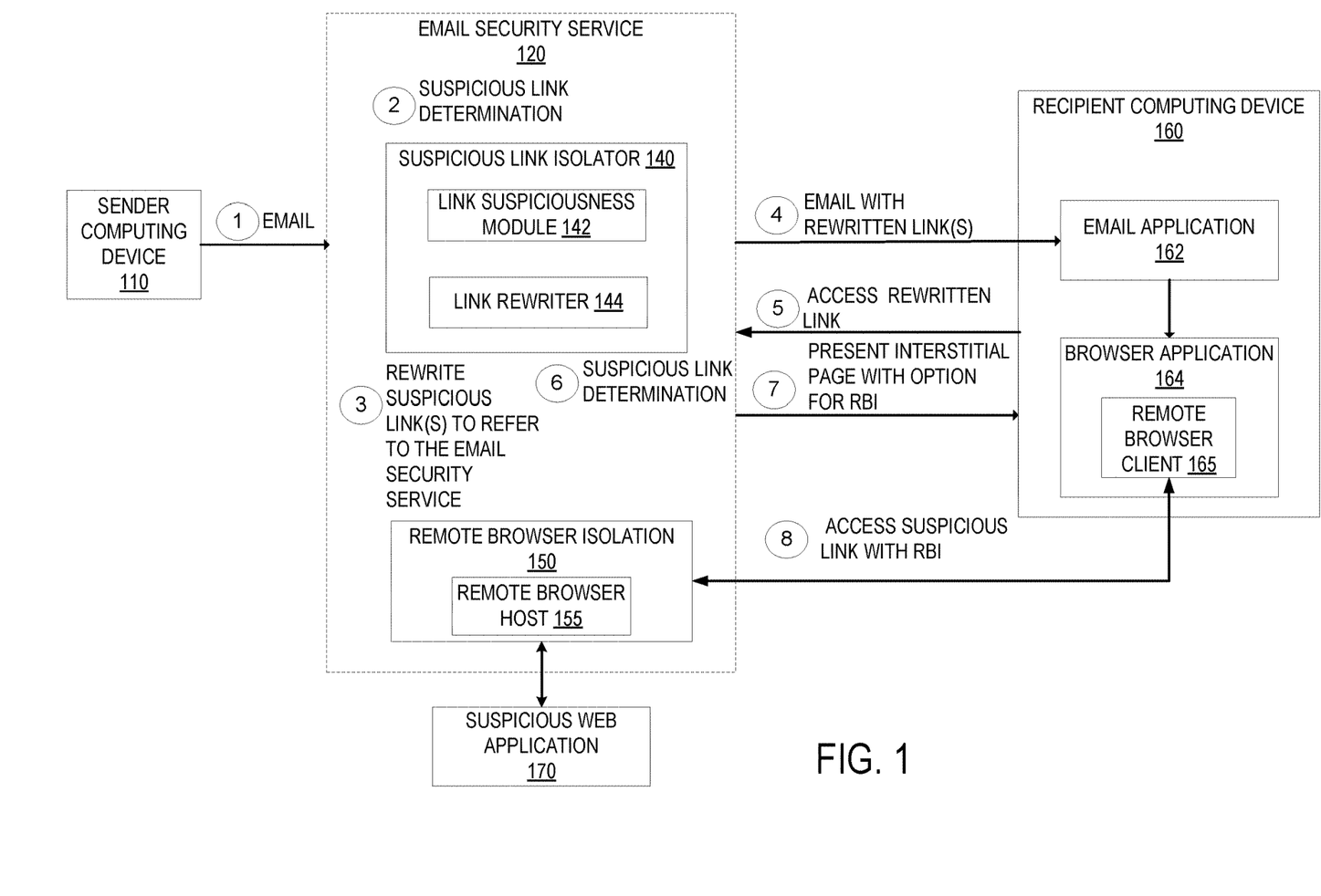
FIG. 1 illustrates an exemplary system for isolating suspicious links according to an embodiment.

FIG. 1 illustrates an exemplary system for isolating suspicious links according to an embodiment. The sender computing device 110 transmits an electronic mail (email) at operation 1. The intended recipient of the email is a recipient that operates the recipient computing device 160. The sender computing device 110 and the recipient computing device 160 are each a computing device such as a desktop, laptop, tablet, smartphone, wearable device, or other computing device that can send and/or receive email.

Email that is intended for the intended recipient is first received by the email security service 120. For example, the domain of the intended recipient is protected by the email security service 120 such that incoming email is first received by the email security service 120. The email security service 120 may be part of the system of the email provider of the recipient or may be separate from the system of the email provider of the recipient. In either case, the email sent at operation 1 is received at the email security service 120. In the case of the email security service 120 being part of the email provider system, the email may be communicated with the email security service 120 prior to the email being delivered to the inbox of the recipient. In the case of the email security service 120 being separate from the email provider system, email may be received by the email security service 120 through an inline deployment (prior to reaching the inbox of the users) or through an API deployment (after reaching the inbox of the users). In an inline deployment, the email security service 120 is a hop in the SMTP processing chain. For example, an MX DNS record for the domain of the intended recipient has been changed to point to a domain of the email security service. Further, the email provider for the intended recipient may need to be modified to accept messages from the IP address(es) of the email security service 120. In an API deployment, the email provider provides an API that allows the email security service 120 to analyze email messages.

The email security service 120 includes a suspicious link isolator 140 that isolates suspicious links in email messages. A suspicious link is a link that potentially points to a malicious resource such as a malicious web page. In an embodiment, the suspicious link isolator 140 performs a suspicious link determination prior to a link being selected (sometimes referred herein as at "email time") and performs a suspicious link determination responsive to the link being selected (sometimes referred herein as at "selection time"). The suspicious link determination at email time may be done on each external link in the email. As illustrated in FIG. 1, the email security service 120 performs a suspicious link determination at operation 2 (at "email time").

The suspicious link isolator 140 analyzes the email to determine whether it includes one or more suspicious links. The suspicious link isolator 140 includes components including the link suspiciousness module 142 and the link rewriter 144.

The link suspiciousness module 142 performs one or more functions to determine the suspiciousness of a link. The link that is included in the email may be the start of a link referral chain. For example, some malicious entities use legitimate services to redirect to a malicious link. The link suspiciousness module 142 may determine the end of the link referral chain and apply the function(s) at the link in the email, the intermediary link(s), and/or the last link. The link suspiciousness module 142 can determine the end of the link referral chain by following HTTP redirect(s) (e.g., HTTP 301 or 302 redirects). When discussing the suspiciousness of a link in this description, the overall suspiciousness of the entire chain of link(s), if any, may be taken into account.

Some attackers may attempt to avoid detection by providing the "wrong" answer (e.g., a benign page, an error) in the referral chain when it detects the request is being sourced from an email security system such as the email security service 120 (e.g., based on the source IP address of the request). Or in some cases the link referral chain may not provide the true result as a result of geofencing (e.g., the source IP address of the request from the email security service 120 maps to a geolocation that is not permitted or treated differently). In an embodiment, the link suspiciousness module 142 detects whether the true result of an email referrer chain is received and uses this result when determining suspiciousness of a link.

The link suspiciousness module 142 may include a rule engine that allows the use of a list of rules or features values indicating the presence/absence of a feature to be conditioned on Boolean logic. The features may include the domain age (taken from registration data), whether the domain is newly seen in DNS traffic (e.g., whether the domain has first had visits within a predetermined time such as within the last 24 hours), a category of the domain (e.g., spam, malware, etc.) from existing reputation lists, link reputation ratings from a machine learning model, and/or keywords in the domain that correspond to well-known organizations (e.g., banks or other financial institutions, tech websites, retailers, government organizations, etc.). One such example rule is to consider a link to be a suspicious link if the link is for a newly registered domain (within a predetermined time such as within 7 days or within 14 days). Another example rule is to consider a link to be a suspicious link if the rating from the machine learning model indicates the link is suspicious.

The machine learning may include evaluating the domain name and/or the path of the link. The model may be trained to recognize patterns of syntactic features and semantic features that are predictive of phishing. A syntactic feature may refer to a characteristic of the syntax of an input such as the order of characters including whether a sequence of characters is part of a top-level domain name, a subdomain, a path, a filename, or a query string of a URL. A semantic feature may refer to a meaning of a word or phrase of an input. For example, a semantic feature of a domain name may provide information relating to the type or category of web sites to which the domain name belongs; such as whether the domain name represents a brand name or a commercial web site or the particular type of commercial web site. The use of a combination of syntactic and semantic features enables the system to evaluate the likely maliciousness of an input considering both semantic meaning and order of occurrence of bait text relative to non-bait text via algorithmically determined syntactic features. Context data obtained for the domain name may be used. For example, the domain name may be used as a query to lookup the IP address(es) that is associated with Autonomous System Number (ASN) data. The IP address for the domain name can be used to determine geolocation data associated with the domain name, and the geolocation data is used as a numeric feature. For example, geolocation data includes longitude and latitude measurements associated with the IP address, in an embodiment, and the longitude and latitude measurements are used to evaluate the suspiciousness of the link.

In an embodiment, in addition to considering features of the URL and network information, the content that is referenced by the link may be analyzed. Because analyzing the content can introduce a delay in the delivery of the email, the link suspicious module 142 may include a rule engine to determine whether to fetch and analyze the content of the email. The rule engine may be based on a risk score that is generated based on the features of the URL and network information. If such a risk score is greater than a threshold that indicates a reasonable likelihood of being suspicious, then the content of the link may be fetched and analyzed. The HTML, CSS, and/or JavaScript of the resulting page may be analyzed. Example content features include character count features, text-to-image ratio features, text distance features, and/or entropy score features. Other example features include HTML tokens and text of web pages of well-known organizations to detect the cloning of legitimate websites, and HTML tokens and text of known malicious code (e.g., script and code that are known to be used by malicious sites). The character count is a content feature that represents the number of unique characters (which may be case-sensitive or case-insensitive). The text-to-image ratio is a value that represents the ratio between the number of text tags to the number of image tags. Malicious web pages often have a lower text-to-image ratio than benign pages. A text distance feature may measure a text distance (e.g., cosine distance between two strings, an edit distance such as the Levenshtein distance, longest common subsequence (LCS) distance, Hamming distance, or Jaro-Winkler distance) between the domain of the link and the page title of the content. Malicious web pages often have a page title that differs substantially from the domain of the link. The entropy score is a value that represents the amount of entropy in the text of the page (e.g., Shannon entropy, an absolute entropy, a normalized entropy).

A content classifier logic may be used to determine a risk score for the content based on the content features. The content classifier logic may be a logistic regression classifier, a linear support vector machine classifier, a random forest classifier, a nearest neighbor classifier, a Bayesian classifier, or a neural network. The resulting score can be used by the link suspiciousness module 142 when determining whether a link is suspicious.

In an embodiment, a machine learning model such as a random forest binary classifier can be used to aggregate the rules for determining whether to trigger the link rewriting of a suspicious link.

In an embodiment, the customer of the email security service 120 may define the threshold value for triggering the link isolation based on a suspicious link determination confidence level.

If the result of the suspicious link determination of operation 2 is that the link is suspicious, the link rewriter 144 rewrites that link to refer to the email security service 120. The link that is rewritten is the original link included in the email. If that modified link is selected, the request will be transmitted to the email security service 120 instead of the original link. If a link is determined not to be suspicious, the link is not rewritten. As shown in FIG. 1, at operation 3, the email security service 120 rewrites any suspicious link(s) to refer to the email security service 120. The email with the rewritten link(s) is then delivered from the email security service 120 to the intended recipient at operation 4.

Figure 2:
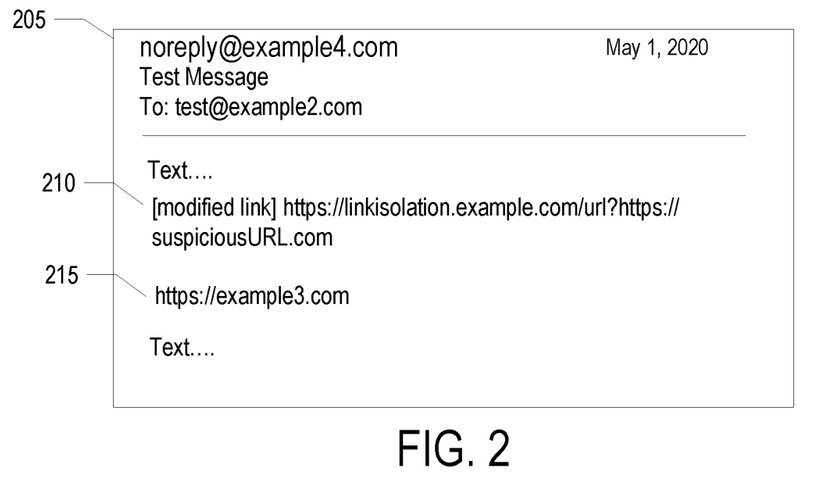
FIG. 2 illustrates an example of an email that includes a modified link that has been rewritten to refer to the email security service according to an embodiment.

FIG. 2 illustrates an example of an email 205 that includes a modified link 210 that has been rewritten to refer to the email security service 120. The original link, which in this example has the domain suspiciousURL.com, has been determined by the email security service 120 to be a suspicious link. The URL of it is rewritten to include the domain linkisolation.example.com, which is the example domain of the email security service 120. The email 205 also includes a link 215 that has not been rewritten because email security service 120 did not determine the link to be suspicious.

The recipient computing device 160 includes the email application 162 and the browser application 164. The email application 162 allows the user of the recipient computing device 160 to send and receive email. The email application 162 can be a standalone email client (e.g., a desktop client or a mobile application) or can be accessed through the browser application 164. The browser application 164 allows the recipient computing device 160 to access network resources (e.g., web pages, images, PDF files, video files, audio files, etc.) and can be a web browser, a mobile application, or other network application.

At some point, the recipient computing device 160 accesses the email with the rewritten link(s) using the email application 162. For instance, the user of the recipient computing device 160 uses the email application 162 to open the email that is shown in FIG. 2. If the user does not access a rewritten link, no further action is taken related to this description. However, if the user accesses the rewritten link, the browser application 164 transmits a request for the resource to the email security service 120 instead of to the original destination of the link. As illustrated in FIG. 1, at operation 5, the recipient computing device 160 accesses a rewritten link and a request is transmitted to the email security service 120.

At operation 6, the link suspiciousness module 142 performs a suspicious link determination for the link that has been modified. This suspicious link determination may be like the suspicious link determination performed at email time. For instance, the suspiciousness module 142 may determine the reputation of the link using the link suspiciousness module 142 in a similar way as previously described. In addition, suspicious link determination may include accessing the URL and determining one or more characteristics including: performing a phishing scan, whether Content Security Policy (CSP) headers are found, certificate data (e.g., TLS certificate(s), HTTP request and response data, page performance data, DNS records, whether cookies are set to secure and HttpOnly, and what technologies and/or libraries the page uses.

The phishing scan may include fetching and analyzing the page content including the HTML, CSS, and/or JavaScript of the page like as elsewhere described. Like as described with respect to scanning at email time, the link suspiciousness module 142 may include a rule engine that allows the use of a list of rules or features values indicating the presence/absence of a feature to be conditioned on boolean logic. In this case, the features may include HTML tokens and text. For example, the features may include HTML tokens and text of web pages of well-known organizations to detect the cloning of legitimate websites and/or include HTML tokens and text of known malicious code (e.g., script and code that are known to be used by malicious sites). The rules can use exclusion criteria to disallow matching on the original and legitimate website. In an embodiment, a machine learning model is used to aggregate the rules (e.g., using a random forest binary classifier).

If the result of the suspicious link determination of operation 6 is that the link is suspicious, the email security service 120 causes an interstitial page to be presented to the recipient computing device 160 at operation 7. The interstitial page includes an option for the user of the recipient computing device 160 to continue to the suspicious link using a remote browser isolation (RBI) session. The interstitial page may also include an option for the user of the recipient computing device 160 to continue to the suspicious link directly. The email security service 120 may cause the interstitial page to be provided to the recipient computing device 160 by redirecting the recipient computing device 160 to the interstitial page.

Figure 3:
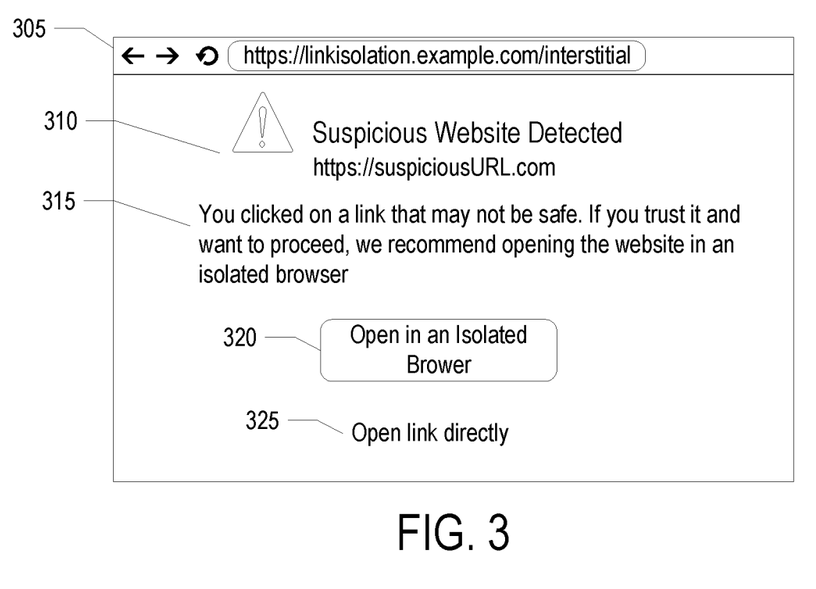
FIG. 3 is an example interstitial page according to an embodiment.

FIG. 3 is an example interstitial page according to an embodiment. The interstitial page 305 includes an indication 310 that the link that was selected is suspicious. The interstitial page 305 includes a description 315 that provides further information to the user such as alerting the user to a recommendation to proceed by opening the website in an isolated browser if they want to continue. The interstitial page 305 includes a button 320 that, when selected, causes the suspicious website to open in an isolated browser. The interstitial page 305 also includes an element 325 that, when selected, causes the suspicious website to open the link directly in the regular browser.

If the user selects to proceed with accessing the suspicious link in an isolated browser, then at operation 8 of FIG. 1, the recipient computing device 160 accesses the suspicious link using an RBI session using a remote browser isolation session. In the example of FIG. 1, the suspicious link refers to the suspicious web application 170. In an embodiment, the recipient computing device 160 launches a dedicated application for isolated browsing if the user selects to access the suspicious link in an isolated browser. In another embodiment, the standard browser application 164 is used for executing a remote browsing session. A remote browser host 155 is created by the remote browser isolation 150 (e.g., a containerized instance) and a remote browser client 165 is created within the browser application 164. During the remote browsing session, input received by the remote browser client 165 such as keystrokes, mouse commands, scroll commands, and other cursor and input events, are sent to the remote browser host 155 for further processing. In effect, the remote browser client 165 on the browser application 164 controls the remote browser host 155. The remote browser host 155 receives and transmits internet traffic to the suspicious web application 170 on behalf of the remote browser client 165. The remote browser host 155 can perform actions like a normal browser such as downloading web pages, uploading data, applying style sheet definitions, executing client-side scripts (e.g., JavaScript), etc. The remote browser host 155 can transmit the data to the remote browser client 165 for display. Thus, the execution actions of the web applications are performed at the remote browser host 155 thereby minimizing vulnerabilities caused by downloading web pages with malicious content, execution of client-side scripts with malicious content, or applying stylesheet definitions. Any malicious tinkering with the executable code in the remote browser host 155 is restricted to the particular isolation environment. Further, when the remote browser client 165 exits, the isolation environment (e.g., the container) is removed so that any malware is not perpetuated by the remote browser host 155. Thus, by executing the browser code and controlling user interactions on a remote server rather than a user device, all malware and phishing attempts are isolated, and won't infect devices and compromise user identities. This improves both user and endpoint security when there are unknown risks and unmanaged devices, and allows users to access websites without having to connect to a VPN or having strict firewall policies.

In an embodiment, as part of establishing a remote browsing session with the browser application 164, the remote browser client 165 is served to the browser application 164. For example, the remote browser client 165 may be a web-based remoting client that connects to the remote browser host 155. The remote browser host 155 may intercept draw commands and transmit the vector draw commands to the remote browser client 165 for rendering. The remote browser client 165 may be implemented using a client-side script (e.g., a JavaScript file), a WebAssembly library or other binary-code format library for handling draw commands, and an HTML file. The client-side script may interface with an application programming interface (API) of the browser application 164 to cause the browser application 164 to load and hook the rendering file into the event loop, to intercept events from an event loop to listen for events associated with the local browser and invoke the draw handling code in the rendering file (for example, using callbacks from the browser's internal event loop), and is configured to initiate a secure connection (e.g., via WebRTC or other secure connection) from the remote browser client 165 to the remote browser host 155. The binary-code format library (e.g., the WebAssembly file) includes the draw handling code in a compiled instance of a graphics library that is typically configured to cause draw commands to be rendered in the same manner on the remote browser client 165 as on the remote browser host 155 to ensure consistent rendering. The HTML file is typically configured to cause the remote browser client 165 to generate a drawing canvas, which if it incorporates HTML5, may interface to one or more GPUs.

In an embodiment, the remote browser isolation session is implemented within a tab of the browser application 164 where other browser tab(s), if any, are independent. If the user navigates to a new site in the remote browser isolation session, they will remain in that tab. The remote browser isolation session may exist until the user closes the tab or browser.

In an embodiment, the remote browser isolation session is implemented by the remote browser host 155 transmitting draw commands to the remote browser client 165 to execute as previously described. In another embodiment, the remote browser isolation session is implemented through pixel pushing. In a pixel pushing embodiment, the remote browser host 155 transmits a series of images to the local browser as possibly compressed pixels or videos. In another embodiment, the remote browser isolation session is implemented through Document Object Model (DOM) remoting/mirroring. With this solution, the DOM corresponding to a page is sanitized before it is sent to the client to remove potentially malicious code and reconstructed on the client before rendering. Using DOM mirroring, a sanitizing process on the isolated browser computing system (e.g., a server) identifies bad HTML and active content and cleans up the DOM tree and reformats it without the active content or with content that has been transcoded into a safe format. In such an embodiment, the remote browser host 155 transmits the cleaned up web page to the local browser.

Figure 4:
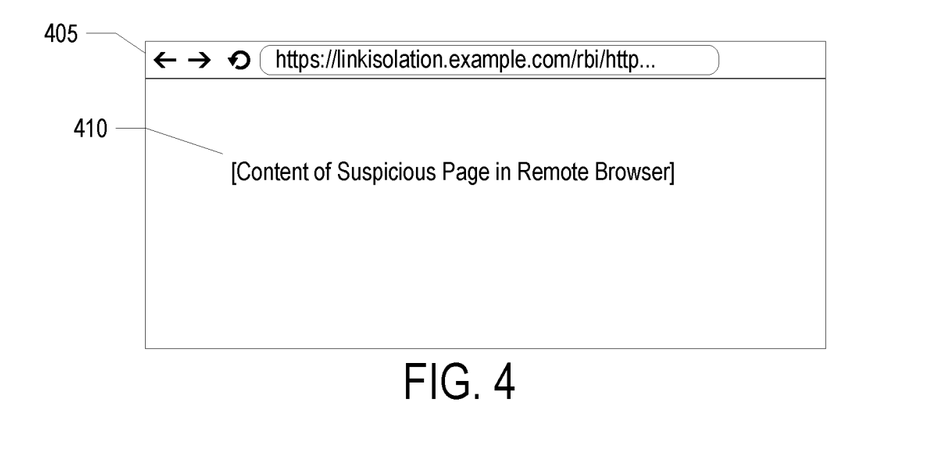
FIG. 4 is an example of the suspicious page being opened in a remote browser according to an embodiment.
Figure 5:
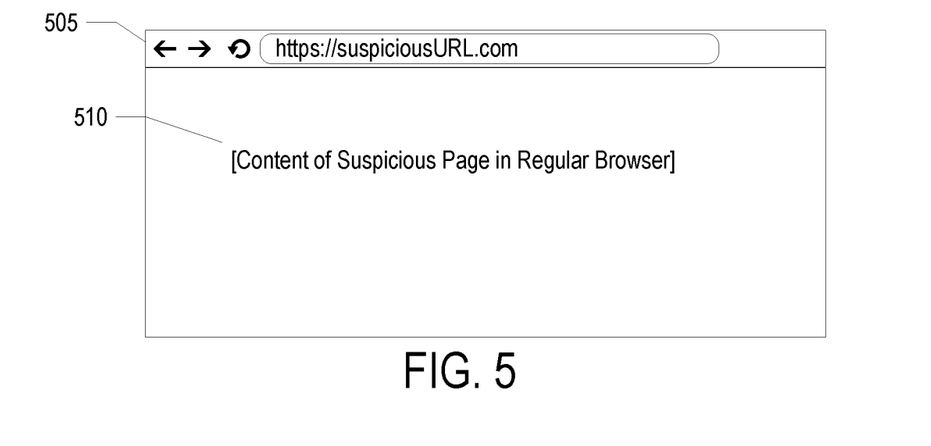
FIG. 5 is an example of the suspicious page being opened in a conventional browser according to an embodiment.

FIG. 4 is an example of the suspicious page 410 being opened in a remote browser 405 according to an embodiment. This page may be loaded in the remote browser responsive to the button 320 being selected. As shown in FIG. 4, the URL of the page has the domain linkisolation-.example.com that is an indication that the suspicious link is being displayed through an isolated browser. FIG. 5 is an example of the suspicious page 510 being opened in a conventional browser 505 according to an embodiment. This page may be loaded by the conventional browser responsive to the element 325 being selected. As shown in FIG. 5, the URL of the page has the domain of the suspicious URL.

As described elsewhere, some attackers may attempt to avoid detection by providing the "wrong" answer in the referral chain. However, even if the email security service 120 does not get the true result from the link referral chain, the remote browser isolation session will likewise receive the "wrong" answer and therefore the user is not presented with the malicious page. If the email security service 120 receives the true result in the referral chain (and this result is determined to be suspicious), then the suspicious page can be opened in a remote browser isolation session.

The email security service 120 may be provided by a distributed cloud computing network that includes multiple servers geographically distributed. The suspicious link isolator 140 and/or the remote browser isolation can be provided by the same server or in cooperation with multiple servers. Additionally, there may be multiple remote browser servers that are part of multiple data centers to which the recipient computing device 160 can connect. The remote browser servers may be anycasted to the same IP address. The recipient computing device 160 may connect to a particular remote browser server due to the client device being closest to that remote browser server (out of the remote browser servers) in terms of routing protocol configuration (e.g., Border Gateway Protocol (BGP) configuration) according to an anycast implementation as determined by the network infrastructure (e.g., router(s), switch(es), and/or other network equipment). In such an embodiment, even though the client device can establish different remote browsing sessions with different remote browser servers (which may be geographically separate), the remote browser data may be communicated from the client device to the remote browser host dynamically thereby providing a consistent experience.

Figure 6:
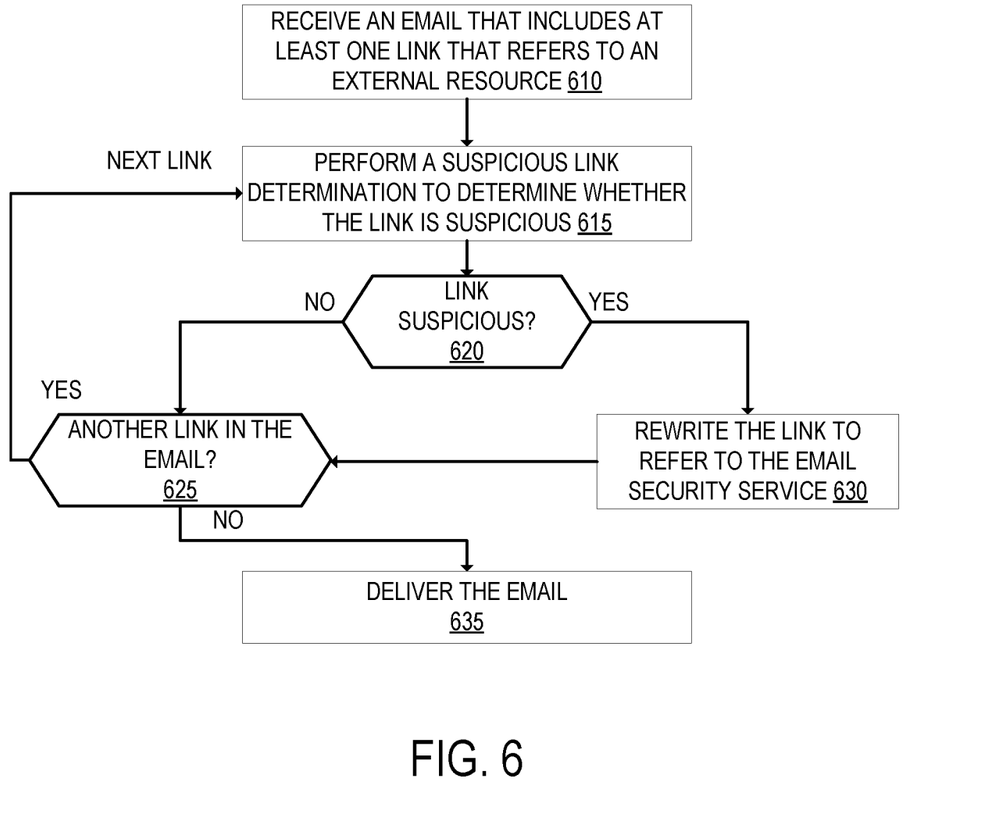
FIG. 6 is a flow diagram that illustrates exemplary operations for providing an email security service that isolates suspicious links in emails according to an embodiment.

FIG. 6 is a flow diagram that illustrates exemplary operations for providing an email security service that isolates suspicious links in emails according to an embodiment. The operations of FIG. 6 and other flow diagrams are described with respect to the exemplary embodiment of FIG. 1. However, the operations of FIG. 6 and the other flow diagrams can be performed by different embodiments and the embodiment of FIG. 1 can perform operations different from that of FIG. 6 and the other flow diagrams.

At operation 610, the email security service 120 receives an email that includes at least one link that refers to an external resource. The email is intended for a recipient. The email security service 120 may receive the email through an inline deployment or through an API deployment. The email security service 120 analyzes the email and determines that it includes at least one link. For example, the email security service 120 determines that the email includes at least one URL. The email may include multiple links.

Next, at operation 615, the email security service 120 performs a suspicious link determination to determine whether the link is suspicious. This determination is done prior to the link being selected (at "email time"). The link that is included in the email may be the start of a link referral chain. For example, some malicious entities use legitimate services to redirect to a malicious link. The email security service 120 may determine the end of the link referral chain and apply the function(s) at the link in the email, the intermediary link(s), and/or the last link. The email security service 120 may perform one or more functions to determine the suspiciousness of the link. For example, the email security service 120 may include a rule engine that allows the use of a list of rules or features values indicating the presence/absence of a feature to be conditioned on Boolean logic. The features may include the domain age (taken from registration data of the domain of the link), whether the domain is newly seen in DNS traffic (e.g., whether the domain has first had visits within a predetermined time such as within the last 24 hours), a category of the domain (e.g., spam, malware, etc.) from existing reputation lists, link reputation ratings from a machine learning model, and/or keywords in the domain that correspond to well-known organizations (e.g., banks or other financial institutions, tech websites, retailers, government organizations, etc.). One such example rule is to consider a link to be a suspicious link if the link is for a newly registered domain (within a predetermined time such as within 7 days or within 14 days). Another example rule is to consider a link to be a suspicious link if the rating from the machine learning model indicates the link is suspicious. The machine learning model may be like as previously described.

In an embodiment, in addition to considering features of the URL and network information, the content that is referenced by the link may be analyzed like as previously described. A machine learning model such as a random forest binary classifier can be used to aggregate the rules for determining whether to trigger the link rewriting of a suspicious link.

If the link is determined to be suspicious at operation 620, then operation 630 is performed. If the link is not determined to be suspicious at operation 620, then control flows to operation 625. In an embodiment, the result of the suspicious link determination at operation 615 is a score that indicates a level of confidence regarding the suspicious link determination or the level of confidence itself (e.g., low, medium, high, very high). In an embodiment, the customer of the email security service 120 may define the threshold value for triggering the link isolation based on the suspicious link determination confidence level. As an example, the customer may define that all links above a medium suspiciousness confidence level are to be rewritten.

At operation 630, the email security service 120 rewrites the link to refer to the email security service 120 instead of the domain of the original link. For example, the original link may be wrapped with a domain of the email security service 120. That is, the original link may be included within the rewritten link. FIG. 2 shows an example of a link that has been rewritten. After email delivery, a rewritten link remains rewritten regardless of whether it is forwarded or replied to. If the modified link is selected, the request is transmitted to the email security service 120 instead of the original link. Next, operation 625 is performed.

At operation 625, a determination is made whether there is another link in the email. If there is, then flow moves back to operation 615 where a suspicious link determination is performed to determine whether the next link is suspicious. If there is not another link in the email, then operation 635 is performed where the email is delivered. If a link was rewritten to refer to the email security service, the email will include the rewritten link. If a link was not rewritten, then the email is delivered without modifying any of the links to refer to the email security service 120.

Figure 7:
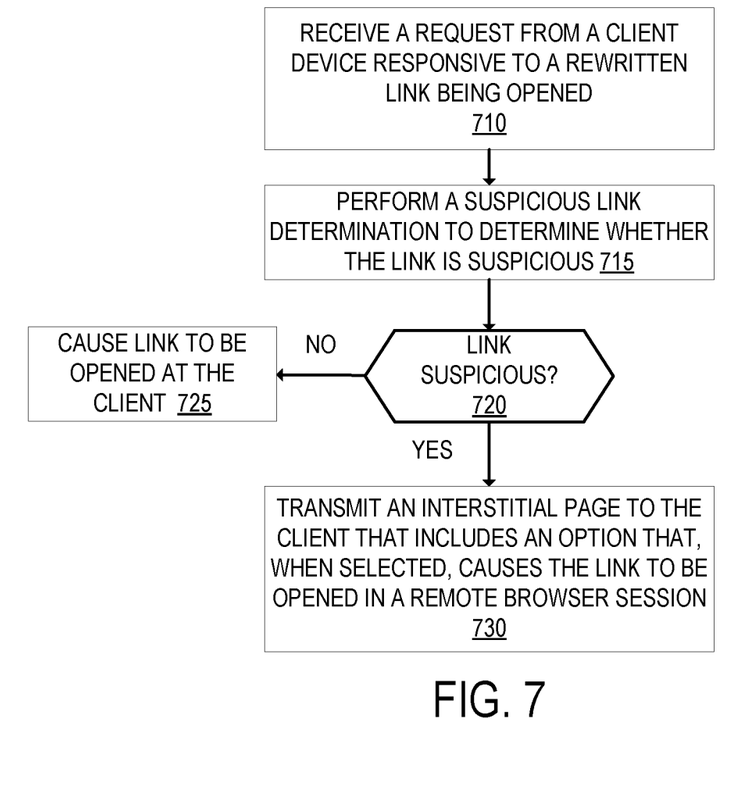
FIG. 7 is a flow diagram that illustrates exemplary operations that are performed responsive to a rewritten link being accessed according to an embodiment.

A rewritten link may or may not be opened. FIG. 7 is a flow diagram that illustrates exemplary operations that are performed responsive to a rewritten link being accessed according to an embodiment. At operation 710, the email security service 120 receives a request from a client device (e.g., the recipient computing device 160) responsive to a rewritten link being opened.

At operation 715, the email security service 120 performs a suspicious link determination to determine whether the link is suspicious. This suspicious link determination may be like the suspicious link determination performed at email time. In addition, the content of the resource and/or properties of the connection can be used when determining whether the link is suspicious. For example, the email security service 120 may access the link and perform one or more of the following: perform a phishing scan, determine, whether CSP headers are found, determine certificate data (e.g., TLS certificate(s)), determine HTTP request and response data, determine page performance data, analyze DNS records, determine whether cookies are set to secure and HttpOnly, and determine what technologies and/or libraries the page uses. These characteristics may be used in the features.

The features may include HTML tokens and text. For example, the features may include HTML tokens and text of web pages of well-known organizations to detect the cloning of legitimate websites. The rules may include HTML tokens and text of known malicious code (e.g., script and code that are known to be used by malicious sites). The rules can use exclusion criteria to disallow matching on the original and legitimate website. In an embodiment, a machine learning model is used to aggregate the rules (e.g., using a random forest binary classifier).

If the link is determined to be suspicious at operation 720, then operation 730 is performed. If the link is not determined to be suspicious at operation 720, then operation 725 is performed where the email security service 120 causes the link to be opened at the client device. For example, the email security service 120 may redirect the client device to the link.

In an embodiment, the result of the suspicious link determination at operation 715 is a score that indicates a level of confidence regarding the suspicious link determination or the level of confidence itself (e.g., low, medium, high, very high). In an embodiment, the customer of the email security service 120 may define the threshold value for triggering the link isolation based on the suspicious link determination confidence level. As an example, the customer may define that all links above a medium suspiciousness confidence level are to be treated as suspicious.

At operation 730 (the link has been determined to be suspicious), the email security service 120 causes an interstitial page to be presented to the client device (e.g., the recipient computing device 160). The interstitial page includes an option for the user of the client device to continue to the suspicious link using a remote browser isolation (RBI) session. The interstitial page may also include an option for the user of the client device to continue to the suspicious link directly. The email security service 120 may cause the interstitial page to be provided to the client device by redirecting the client device to the interstitial page. FIG. 3 shows an example interstitial page.

Figure 8:
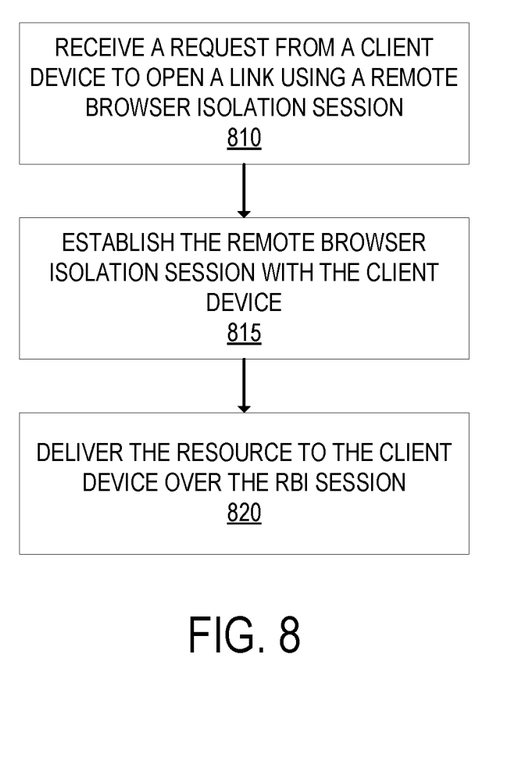
FIG. 8 is a flow diagram that illustrates exemplary operations for opening a link in a remote browser isolation session according to an embodiment.

FIG. 8 is a flow diagram that illustrates exemplary operations for opening a link in a remote browser isolation session according to an embodiment. At operation 810, the email security service 120 receives a request from a client device to open a link using a remote browser isolation session. The request may be sent responsive to a user selecting to open a suspicious URL using a remote browser.

Next, at operation 815, the email security service 120 establishes a remote browser isolation session with the client device. The client device may use a dedicated application for isolated browsing or a standard browser application that executes code for the remote browser isolation session. The email security service 120 creates a remote browser host 155 and a remote browser client is created within the browser application of the client. During the remote browsing session, input received by the remote browser client 165 such as keystrokes, mouse commands, scroll commands, and other cursor and input events, are sent to the remote browser host 155 for further processing. In effect, the remote browser client 165 on the browser application 164 controls the remote browser host 155. The remote browser host 155 can perform actions like a normal browser such as downloading web pages, uploading data, applying style sheet definitions, executing client-side scripts (e.g., JavaScript), etc. The remote browser host 155 can transmit the data to the remote browser client 165 for display.

In an embodiment, as part of establishing a remote browsing session with the client device, the remote browser client 165 is served to the browser application 164. For example, the remote browser client 165 may be a web-based remoting client that connects to the remote browser host 155. The remote browser host 155 may intercept draw commands and transmit the vector draw commands to the remote browser client 165 for rendering. The remote browser client 165 may be implemented using a client-side script (e.g., a JavaScript file), a WebAssembly library or other binary-code format library for handling draw commands, and an HTML file. The client-side script may interface with an application programming interface (API) of the browser application 164 to cause the browser application 164 to load and hook the rendering file into the event loop, to intercept events from an event loop to listen for events associated with the local browser and invoke the draw handling code in the rendering file (for example, using callbacks from the browser's internal event loop), and is configured to initiate a secure connection (e.g., via WebRTC or other secure connection) from the remote browser client 165 to the remote browser host 155. The binary-code format library (e.g., the WebAssembly file) includes the draw handling code in a compiled instance of a graphics library that is typically configured to cause draw commands to be rendered in the same manner on the remote browser client 165 as on the remote browser host 155 to ensure consistent rendering. The HTML file is typically configured to cause the remote browser client 165 to generate a drawing canvas, which if it incorporates HTML5, may interface to one or more GPUs.

Next, at operation 820, the email security service 120 delivers the resource to the client device over the remote browser isolation session. The execution action with this potentially malicious resource is thereby performed at the remote browser host 155 thereby minimizing vulnerabilities caused by downloading web pages with malicious content, execution of client-side scripts with malicious content, or applying stylesheet definitions. Any malicious modification of the executable code in the remote browser host 155 is restricted to the particular isolation environment. When the remote browser client 165 exits, the isolation environment (e.g., the container) is removed so that any malware is not perpetuated by the remote browser host 155. Thus, by executing the browser code and controlling user interactions on a remote server rather than a user device, all malware and phishing attempts are isolated, and will not infect devices and compromise user identities. This improves both user and endpoint security when there are unknown risks and unmanaged devices, and allows users to access websites without having to connect to a VPN or having strict firewall policies.

Although an embodiment has been described that presents an interstitial page to the user that includes an option for the user to proceed to the suspicious site in a remote browser isolation session, in another embodiment responsive to determining that a selected link is suspicious, the email security service 120 automatically causes the selected link to be loaded in a remote browser isolation session. In such an embodiment, there may be a visual indicator to the user that the page is in a remote browser and that it is suspicious.

Figure 9:
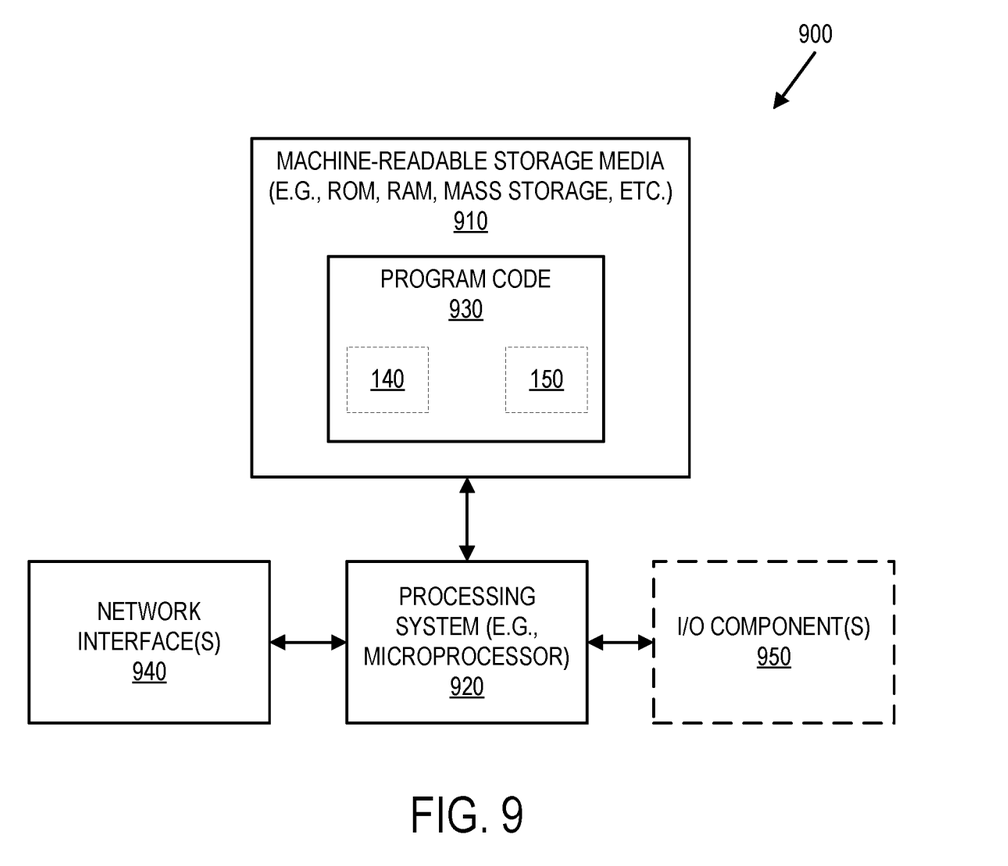
FIG. 9 illustrates a block diagram for an exemplary data processing system that may be used in some embodiments.

FIG. 9 illustrates a block diagram for an exemplary data processing system 900 that may be used in some embodiments. One or more such data processing systems 900 may be utilized to implement the embodiments and operations described with respect to the email security service 120 and/or client devices. Data processing system 900 includes a processing system 920 (e.g., one or more processors and connected system components such as multiple connected chips).

The data processing system 900 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory) and machine-readable transmission media (also called a carrier)

(e.g., electrical, optical, radio, acoustical or other form of propagated signals—such as carrier waves, infrared signals), which is coupled to the processing system 920. For example, the depicted machine-readable storage media 910 may store program code 930 that, when executed by the processing system 920, causes the data processing system 900 to execute the suspicious link isolator 140, the remote browser isolation 150, and/or any of the operations described herein.

The data processing system 900 also includes one or more network interfaces 940 (e.g., a wired and/or wireless interfaces) that allows the data processing system 900 to transmit data and receive data from other computing devices, typically across one or more networks (e.g., Local Area Networks (LANs), the Internet, etc.). The data processing system 900 may also include one or more input or output components 950 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 900, and, in certain embodiments, fewer components than that shown in One or more buses may be used to interconnect the various components shown in FIG. 9.

The techniques shown in the figures can be implemented using code and data stored and executed on one or more electronic devices (e.g., a client device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. However, embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to isolate suspicious email links performed by an email security service, comprising:
   receiving an email that includes a first link that refers to a first external resource and further includes a second link to a second external resource, the email intended for a recipient;
   performing a first suspicious link determination to determine whether the first link is suspicious, wherein a first result of the first suspicious link determination is that the first link is suspicious;
   responsive to the first result of the first suspicious link determination, rewriting the first link to refer to the email security service such that responsive to the first link being opened, a request is transmitted to the email security service and not to the first external resource;
   performing the first suspicious link determination to determine whether the second link is suspicious, wherein a second result of the first suspicious link determination is that the second link is not suspicious;
   delivering the email with the rewritten first link and the second link that is not rewritten to the recipient;
   receiving a first request from a client device responsive to the first link being opened;
   performing a second suspicious link determination to determine whether the first link is suspicious, wherein a first result of the second suspicious link determination is that the first link is suspicious; and
   responsive to the first result of the second suspicious link determination, transmitting an interstitial page to the client device that includes an option that, when selected, causes the first link to be opened in a remote browser isolation session.

2. The method of claim 1, further comprising:
responsive to the option being selected that causes the link to be opened in a remote browser isolation session, establishing the remote browser isolation session with the client device.

3. The method of claim 2, wherein establishing the remote browser isolation session with the client device includes transmitting a remote browser client to the client device.

4. The method of claim 3, further comprising:
transmitting draw commands to the remote browser client for rendering at the client device.

5. The method of claim 1, wherein the first suspicious link determination includes a result of a machine learning model being applied to the first link, wherein the machine learning model is trained to recognize patterns of syntactic features and semantic features that are predictive of phishing.

6. The method of claim 1, further comprising:
wherein the email further includes a third link that refers to a third external resource;
performing the first suspicious link determination to determine whether the third link is suspicious, wherein a third result of the first suspicious link determination is that the third link is suspicious;
responsive to the third result of the first suspicious link determination, rewriting the third link to refer to the email security service such that responsive to the third link being opened, a request is transmitted to the email security service and not to the third external resource;
wherein the email that is delivered to the recipient includes the rewritten first link the second link that is not rewritten, and the rewritten third link;
receiving a second request from a client device responsive to the third link being opened;
performing the second suspicious link determination to determine whether the third link is suspicious, wherein a second result of the second suspicious link determination is that the third link is not suspicious; and
responsive to the second result of the second suspicious link determination, causing the second link to be opened by the client device.

7. A non-transitory machine-readable storage medium that provides instructions that, if executed by a processor, will cause operations to be performed including:
receiving an email that includes a first link that refers to a first external resource and further includes a second link to a second external resource, the email intended for a recipient;
performing a first suspicious link determination to determine whether the first link is suspicious, wherein a first result of the first suspicious link determination is that the first link is suspicious;
responsive to the first result of the first suspicious link determination, rewriting the first link to refer to a email security service such that responsive to the first link being opened, a request is transmitted to the email security service and not to the first external resource;
performing the first suspicious link determination to determine whether the second link is suspicious, wherein a second result of the first suspicious link determination is that the second link is not suspicious;
delivering the email with the rewritten first link and the second link that is not rewritten to the recipient;
receiving a first request from a client device responsive to the first link being opened;
performing a second suspicious link determination to determine whether the first link is suspicious, wherein a first result of the second suspicious link determination is that the first link is suspicious; and
responsive to the first result of the second suspicious link determination, transmitting an interstitial page to the client device that includes an option that, when selected, causes the first link to be opened in a remote browser isolation session.

8. The non-transitory machine-readable storage medium of claim 7, wherein the operations further include:
responsive to the option being selected that causes the link to be opened in a remote browser isolation session, establishing the remote browser isolation session with the client device.

9. The non-transitory machine-readable storage medium of claim 8, wherein establishing the remote browser isolation session with the client device includes transmitting a remote browser client to the client device.

10. The non-transitory machine-readable storage medium of claim 9, wherein the operations further include:
transmitting draw commands to the remote browser client for rendering at the client device.

11. The non-transitory machine-readable storage medium of claim 8, wherein the first suspicious link determination includes a result of a machine learning model being applied to the first link, wherein the machine learning model is trained to recognize patterns of syntactic features and semantic features that are predictive of phishing.

12. The non-transitory machine-readable storage medium of claim 7, wherein the operations further include:
wherein the email further includes a third link that refers to a third external resource;
performing the first suspicious link determination to determine whether the third link is suspicious, wherein a third result of the first suspicious link determination is that the third link is suspicious;
responsive to the third result of the first suspicious link determination, rewriting the third link to refer to the email security service such that responsive to the third link being opened, a request is transmitted to the email security service and not to the third external resource;
wherein the email that is delivered to the recipient includes the rewritten first link the second link that is not rewritten, and the rewritten third link;
receiving a second request from a client device responsive to the third link being opened;
performing the second suspicious link determination to determine whether the third link is suspicious, wherein a second result of the second suspicious link determination is that the third link is not suspicious; and
responsive to the second result of the second suspicious link determination, causing the second link to be opened by the client device.

13. An apparatus, comprising:
a processor; and
a non-transitory machine-readable storage medium that provides instructions that, if executed by the processor, will cause the apparatus to perform operations including:
receiving an email that includes a first link that refers to a first external resource and further includes a second link to a second external resource, the email intended for a recipient;
performing a first suspicious link determination to determine whether the first link is suspicious, wherein a first result of the first suspicious link determination is that the first link is suspicious;

responsive to the first result of the first suspicious link determination, rewriting the first link to refer to a email security service such that responsive to the first link being opened, a request is transmitted to the email security service and not to the first external resource;

performing the first suspicious link determination to determine whether the second link is suspicious, wherein a second result of the first suspicious link determination is that the second link is not suspicious;

delivering the email with the rewritten first link and the second link that is not rewritten to the recipient;

receiving a first request from a client device responsive to the first link being opened;

performing a second suspicious link determination to determine whether the first link is suspicious, wherein a first result of the second suspicious link determination is that the first link is suspicious; and responsive to the first result of the second suspicious link determination, transmitting an interstitial page to the client device that includes an option that, when selected, causes the first link to be opened in a remote browser isolation session.

14. The apparatus of claim 13, wherein the operations further include:

responsive to the option being selected that causes the link to be opened in a remote browser isolation session, establishing the remote browser isolation session with the client device.

15. The apparatus of claim 14, wherein establishing the remote browser isolation session with the client device includes transmitting a remote browser client to the client device.

16. The apparatus of claim 15, wherein the operations further include:

transmitting draw commands to the remote browser client for rendering at the client device.

17. The apparatus of claim 13, wherein the first suspicious link determination includes a result of a machine learning model being applied to the first link, wherein the machine learning model is trained to recognize patterns of syntactic features and semantic features that are predictive of phishing.

18. The apparatus of claim 13, wherein the operations further include:

wherein the email further includes a third link that refers to a third external resource;

performing the first suspicious link determination to determine whether the third link is suspicious, wherein a third result of the first suspicious link determination is that the third link is suspicious;

responsive to the third result of the first suspicious link determination, rewriting the third link to refer to the email security service such that responsive to the third link being opened, a request is transmitted to the email security service and not to the third external resource;

wherein the email that is delivered to the recipient includes the rewritten first link, the second link that is not rewritten, and the rewritten third link;

receiving a second request from a client device responsive to the third link being opened;

performing the second suspicious link determination to determine whether the third link is suspicious, wherein a second result of the second suspicious link determination is that the first third link is not suspicious; and responsive to the second result of the second suspicious link determination, causing the second link to be opened by the client device.

\* \* \* \* \*